(12) United States Patent
Kogure

(10) Patent No.: US 9,569,153 B2
(45) Date of Patent: Feb. 14, 2017

(54) IMAGE FORMING APPARATUS WITH WIRELESS COMMUNICATION FUNCTION, CONTROL METHOD THEREFOR, AND STORAGE MEDIUM

(71) Applicant: CANON KABUSHIKI KAISHA, Tokyo (JP)

(72) Inventor: Takeshi Kogure, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/552,678

(22) Filed: Nov. 25, 2014

(65) Prior Publication Data

US 2015/0153979 A1 Jun. 4, 2015

(30) Foreign Application Priority Data

Dec. 2, 2013 (JP) ................................. 2013-249183

(51) Int. Cl.
*G06F 3/12* (2006.01)
(52) U.S. Cl.
CPC ........... *G06F 3/1236* (2013.01); *G06F 3/1204* (2013.01); *G06F 3/1292* (2013.01); *G06F 3/1238* (2013.01)
(58) Field of Classification Search
USPC .............................. 358/474, 1.18, 1.15, 1.14
See application file for complete search history.

(56) References Cited

U.S. PATENT DOCUMENTS

| | | | |
|---|---|---|---|
| 8,983,383 B1* | 3/2015 | Haskin | 455/41.2 |
| 2003/0100335 A1* | 5/2003 | Gassho et al. | 455/552 |
| 2008/0222655 A1* | 9/2008 | Sato | 719/318 |
| 2010/0082999 A1* | 4/2010 | Ando et al. | 713/183 |
| 2010/0167651 A1* | 7/2010 | Sakuda et al. | 455/41.2 |
| 2010/0332906 A1* | 12/2010 | Agrawal et al. | 714/37 |
| 2011/0026075 A1* | 2/2011 | Maruyama et al. | 358/1.15 |
| 2011/0231922 A1* | 9/2011 | Azuma | G06F 21/35 726/9 |
| 2011/0273738 A1* | 11/2011 | Tanaka et al. | 358/1.14 |
| 2011/0320246 A1* | 12/2011 | Tietzen et al. | 705/14.4 |
| 2012/0143707 A1* | 6/2012 | Jain | 705/18 |
| 2012/0190299 A1 | 7/2012 | Takatsuka et al. | |
| 2013/0128311 A1* | 5/2013 | Kim et al. | 358/1.15 |
| 2014/0139873 A1* | 5/2014 | Ishida | 358/1.15 |
| 2014/0143137 A1* | 5/2014 | Carlson | 705/39 |
| 2014/0220939 A1* | 8/2014 | Takae et al. | 455/411 |

FOREIGN PATENT DOCUMENTS

JP 2012-157006 A 8/2012

* cited by examiner

*Primary Examiner* — Jerome Grant, II
(74) *Attorney, Agent, or Firm* — Rossi, Kimms & McDowell LLP

(57) ABSTRACT

An image forming apparatus which reduces the burden on users and enhances the ease of use by not updating information needed for wireless connection while the same user is using the image forming apparatus. Wireless connection information for carrying out a wireless communication between a terminal device and the image forming apparatus is displayed on a display unit. The wireless connection information is changed when users of the image forming apparatus have changed. Even when the wireless communication is terminated, the wireless connection information is not changed during a time period for which it is determined that the same user is using the image forming apparatus.

7 Claims, 10 Drawing Sheets

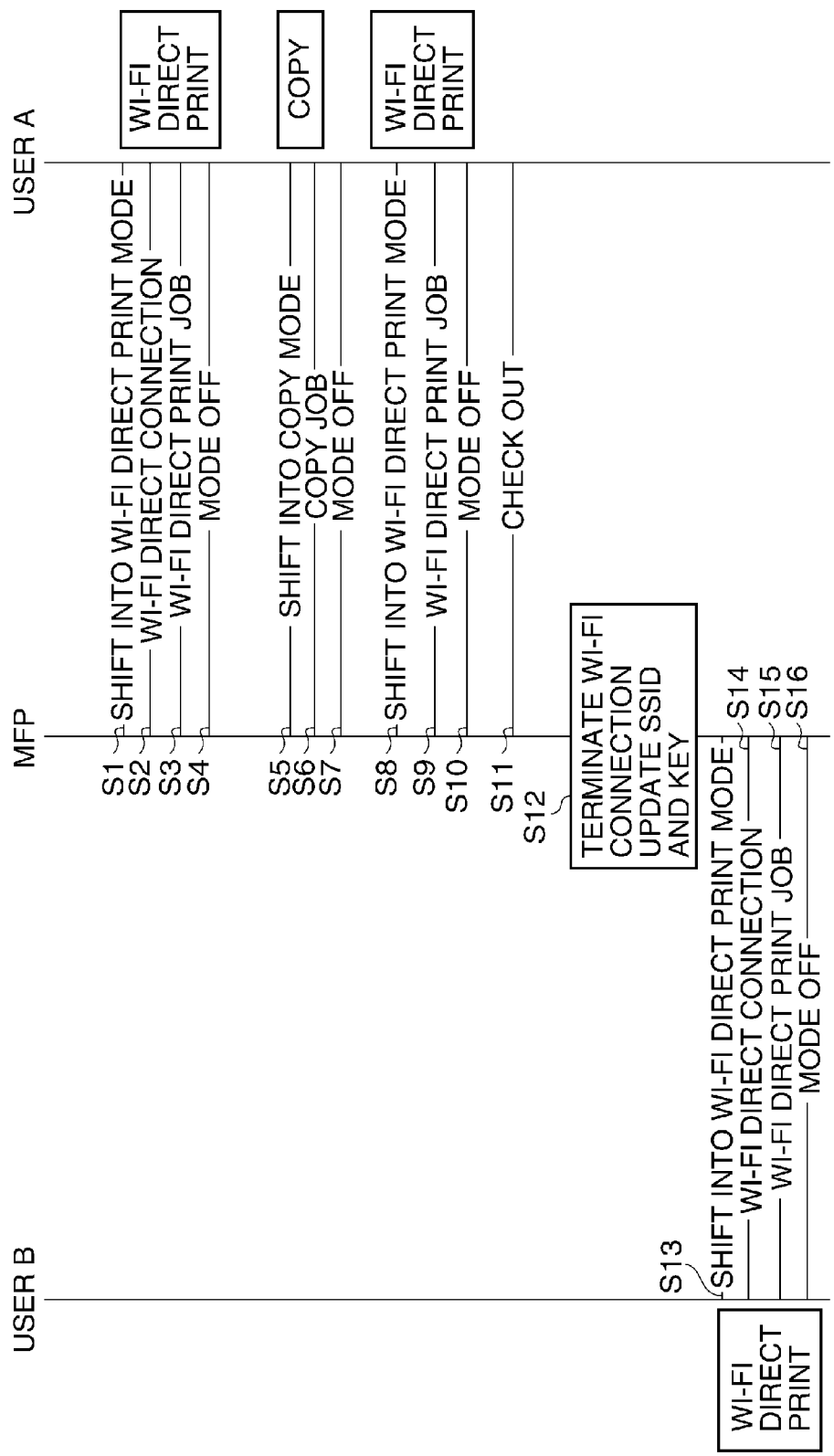

IMAGE FORMING APPARATUS WITH WIRELESS COMMUNICATION FUNCTION, CONTROL METHOD THEREFOR, AND STORAGE MEDIUM

BACKGROUND OF THE INVENTION

Field of the Invention

The present invention relates to an image forming apparatus, a control method therefore, and a storage medium, and in particular to a wireless connection control technique for use in inputting a job to the image forming apparatus from a wireless network using a wireless connection.

Description of the Related Art

Conventionally, image forming apparatuses such as MFPs (Multi Function Peripherals) have a function of inputting a job from a network and processing the same. As disclosed in Japanese Laid-Open Patent Publication (Kokai) No. 2012-157006, it is known that a device and a terminal establish a direct wireless connection by Wi-Fi Direct without using a dedicated access point. It is also known that a terminal stores wireless connection information (including a password, an SSID, and so on) it used before, and when the terminal enters its network communication zone, a wireless connection is automatically established.

Due to these functions, there may be cases where when there is a terminal which has used a device before near the device, a wireless connection with not a terminal of a user who is near the device and going to actually using the device but the other terminal near the device is established first. In this case, the user near the device may not use the device. To avoid this, there is known a control method that updates wireless connection information on the device side whenever a wireless connection is established and prevents connection to the device based on wireless connection information that has been stored before on the terminal side.

However, if wireless connection information on the device side is updated whenever a wireless connection is established, the user has to input wireless communication to the terminal whenever a wireless connection is established, and this places a burden on the user. For example, in a case where after the device is shifted into a wireless job input mode, and a job is input to the device from a wireless network, the device exits the wireless job input mode to perform copying, and then a job is input to the device again from the wireless network, the user is required to make wireless connection settings twice.

SUMMARY OF THE INVENTION

The present invention provides an image forming apparatus and a control method therefore which reduce the burden on users and enhance the ease of use by not updating information needed for wireless connection while the same user is using the image forming apparatus, as well as a storage medium.

Accordingly, a first aspect of the present invention provides an image forming apparatus comprising a wireless communication unit configured to carry out a wireless communication, a display unit configured to display wireless connection information for carrying out the wireless communication between an external device and the image forming apparatus, and a changing unit configured to change the wireless connection information when users of the image forming apparatus have changed, wherein even when the wireless communication is terminated, the changing unit does not change the wireless connection information during a time period for which it can be determined that the same user is using the image forming apparatus.

Accordingly, a second aspect of the present invention provides a control method for an image forming apparatus, comprising a wireless communication step of carrying out a wireless communication, a display unit step of displaying wireless connection information for carrying out the wireless communication between an external device and the image forming apparatus, and a changing step of changing the wireless connection information when users of the image forming apparatus have changed, wherein in the changing step, even when the wireless communication is terminated, the wireless connection information is not changed during a time period for which it can be determined that the same user is using the image forming apparatus.

Accordingly, a third aspect of the present invention provides a non-transitory computer-readable storage medium storing a program for causing a computer to execute a control method for an image forming apparatus, the control method comprising a wireless communication step of carrying out a wireless communication, a display unit step of displaying wireless connection information for carrying out the wireless communication between an external device and the image forming apparatus, and a changing step of changing the wireless connection information when users of the image forming apparatus have changed, wherein in the changing step, even when the wireless communication is terminated, the wireless connection information is not changed during a time period for which it can be determined that the same user is using the image forming apparatus.

According to the present invention, wireless connection information is updated when users have changed, and hence even when the same user establishes a plurality of wireless connections, the user does not have input wireless connection information each time.

Further features of the present invention will become apparent from the following description of exemplary embodiments (with reference to the attached drawings).

BRIEF DESCRIPTION OF THE DRAWINGS

FIG. 8 is a chart showing the flow of wireless connection information update in the system in FIG. 1.

DESCRIPTION OF THE EMBODIMENTS

The present invention will now be described with reference to the drawings showing an embodiment thereof.

Figure 1:
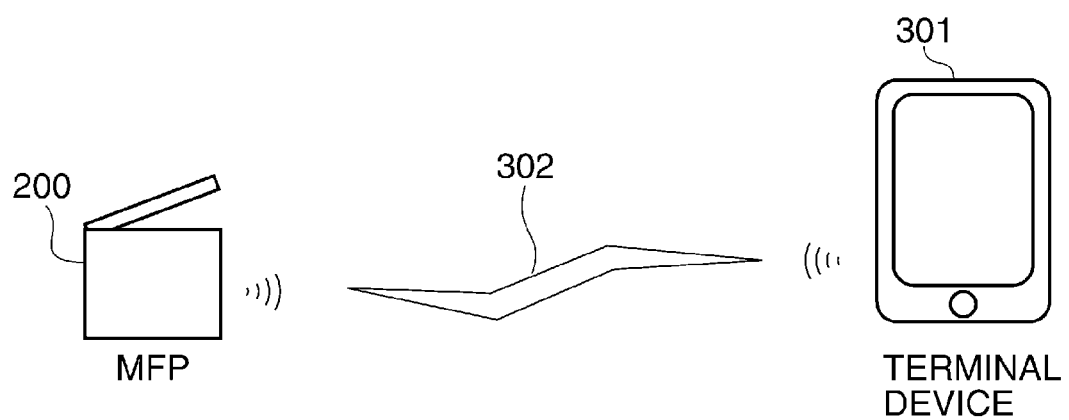
FIG. 1 is a diagram schematically showing an arrangement of a system in which an image forming apparatus according to an embodiment of the present invention is placed.

FIG. 1 is a diagram schematically showing an arrangement of a system in which an image forming apparatus according to an embodiment of the present invention is placed.

An MFP 200, which is the image forming apparatus, is placed in a public space such as a convenience store, and charges users who use the MFP 200 when executing jobs such as copying and printing.

The MFP 200 communicates with a terminal device 301 such as a smartphone or a tablet PC via a wireless network 302. A user operates the terminal device 301, which in turn inputs a job to the MFP 200 via the wireless network 302.

Figure 2:
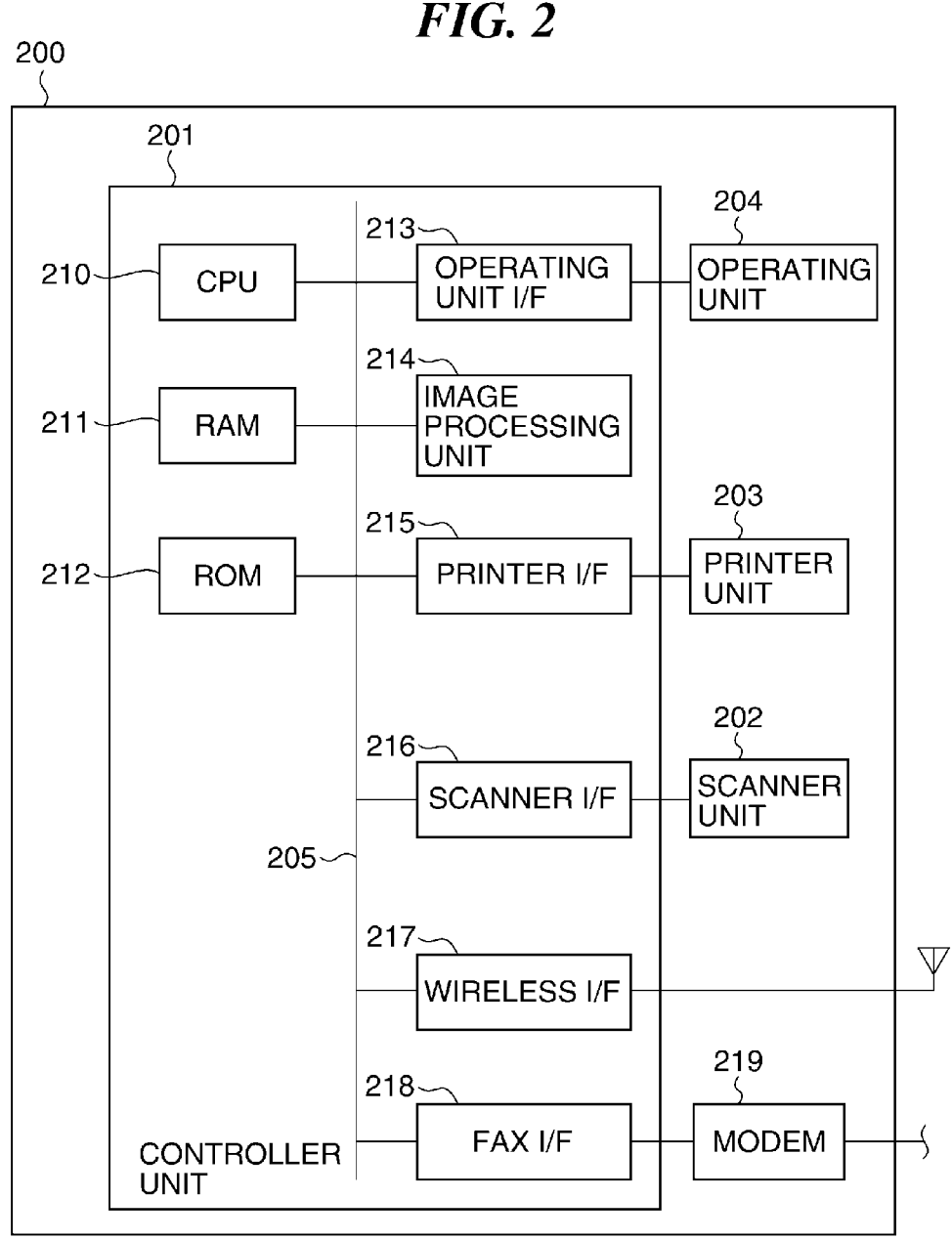
FIG. 2 is a block diagram schematically showing an internal arrangement of an MFP in FIG. 1.

FIG. 2 is a block diagram schematically showing an internal arrangement of the MFP 200 in FIG. 1.

The MFP 200 is comprised of a controller unit 201, a scanner unit 202, a printer unit 203, and an operating unit 204, which are electrically connected to one another. The controller unit 201 has a CPU 210, a RAM 211, a ROM 212, an operating unit I/F 213, an image processing unit 214, a printer I/F 215, a scanner I/F 216, a wireless I/F 217, and a FAX I/F 218, and they are connected to a system bus 205.

In the controller unit 201, the CPU 210 provides centralized control of the MFP 200 in accordance with programs stored in the ROM 212. The RAM 211 acts as work memory for the CPU 210. The ROM 212 stores programs to be loaded by the CPU 210.

The operating unit I/F 213 is connected to the operating unit 204 and sends and receives data to and from the operating unit 204. The CPU 210 receives operations and instructions from the operating unit 204 via the operating unit I/F 213.

The image processing unit 214 corrects, processes, and edits input image data based on instructions from the CPU 210 and carries out printer stabilization, resolution conversion, and so on for print output image data. In addition, the image processing unit 214 rotates, compresses, and decompresses image data.

The printer I/F 215 is connected to the printer unit 203 and sends and receives data to and from the printer unit 203. Upon receiving an instruction to print image data from a user, the CPU 210 sends the image data to the printer unit 203 via the printer I/F 215.

The scanner I/F 216 is connected to the scanner unit 202 and sends and receives data to and from the scanner unit 202. Upon receiving an instruction to read an original from a user, the CPU 210 instructs the scanner unit 202 to read the original and receives image data of the original, which has been read by the scanner unit 202, via the scanner unit 202.

The wireless I/F 217 is connected to an external wireless device (such as the terminal device 301) via an antenna and sends and receives data to and from the external wireless device. The CPU 210 sends image data to external devices via the wireless I/F 217 and receives image data from external devices via the wireless I/F 217.

The FAX I/F 218 is connected to a modem 219 and sends and receives data to and from the modem 219. The CPU 210 sends image data to external devices via the FAX I/F 218 and receives image data from external devices via the FAX I/F 218.

The operating unit 304 has keys for receiving user operations, and a display unit for displaying image data. The keys for receiving user operations may be either hardware keys or software keys using a touch panel. The display unit may be either a liquid crystal display or a CRT.

The printer unit 203 performs printing on sheets and discharges printed sheets. The printer unit 203 is allowed to perform printing using either an electrophotographic process or an inkjet process.

Figure 3:
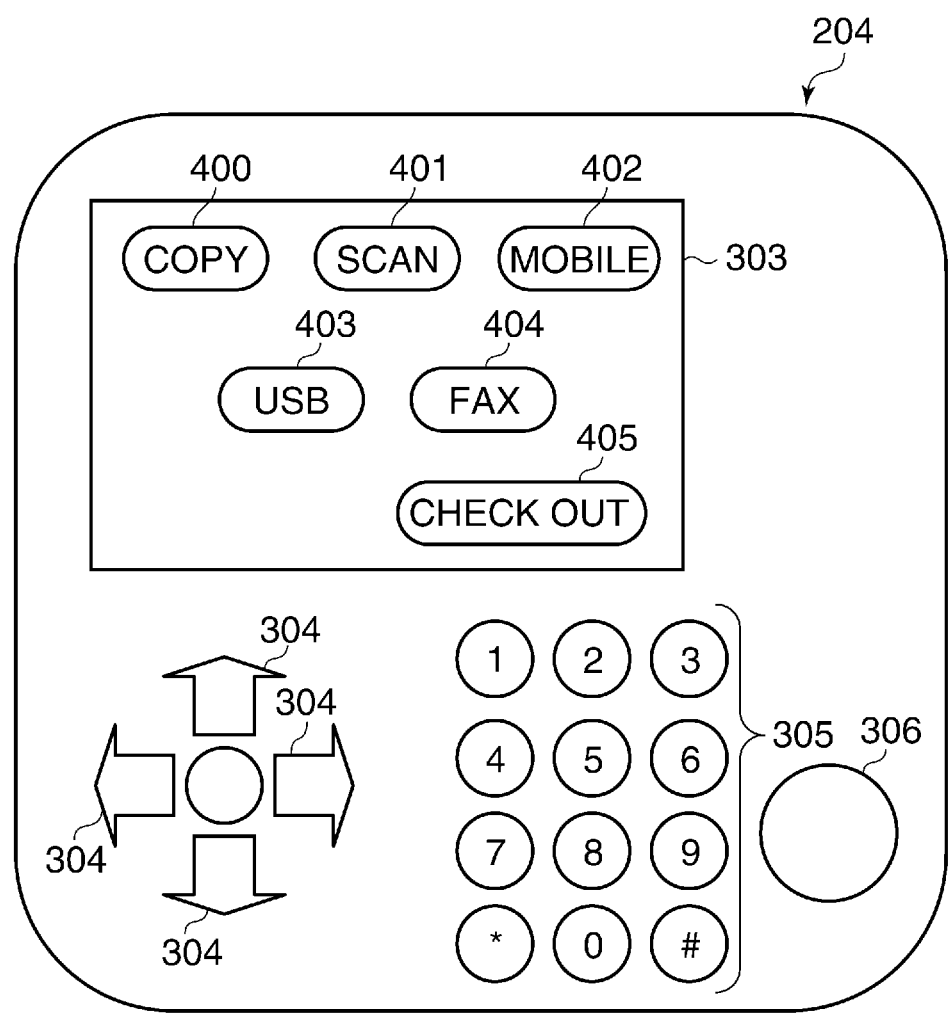
FIG. 3 is a block diagram schematically showing an external arrangement of the MFP in FIG. 2.

FIG. 3 is a block diagram schematically showing an external arrangement of the MFP 204 in FIG. 2.

Referring to FIG. 3, the operating unit 204 has a display unit 303 of a touch panel type, up, down, right, and left keys 304, and a numeric keypad 305, and a start key 306. The up, down, right, and left keys 304 and the numeric keypad 305 are used for users to select and set items. The start key 306 is used for users to issue a print instruction and so on.

A mode selection screen that is displayed when the user selects a function to be executed with the MFP 200 is displayed on the display unit 303 shown in the figure, and the user designates a function through this mode selection screen. A copy button 400 is for activating a copy function with the MFP 200. A scan button 401 is for activating a scan function with the MFP 200. A mobile button 402 is for activating a function of inputting a job from the terminal device 301 or the like by wireless connection (Wi-Fi Direct Print).

A USB button 403 is for activating a function of printing data stored in a USB storage connected to the MFP 200. A fax button 404 is for starting a fax function with the MFP 200. A check-out button 405 is for paying a fee charged for jobs that have been input by the user.

Figure 4:
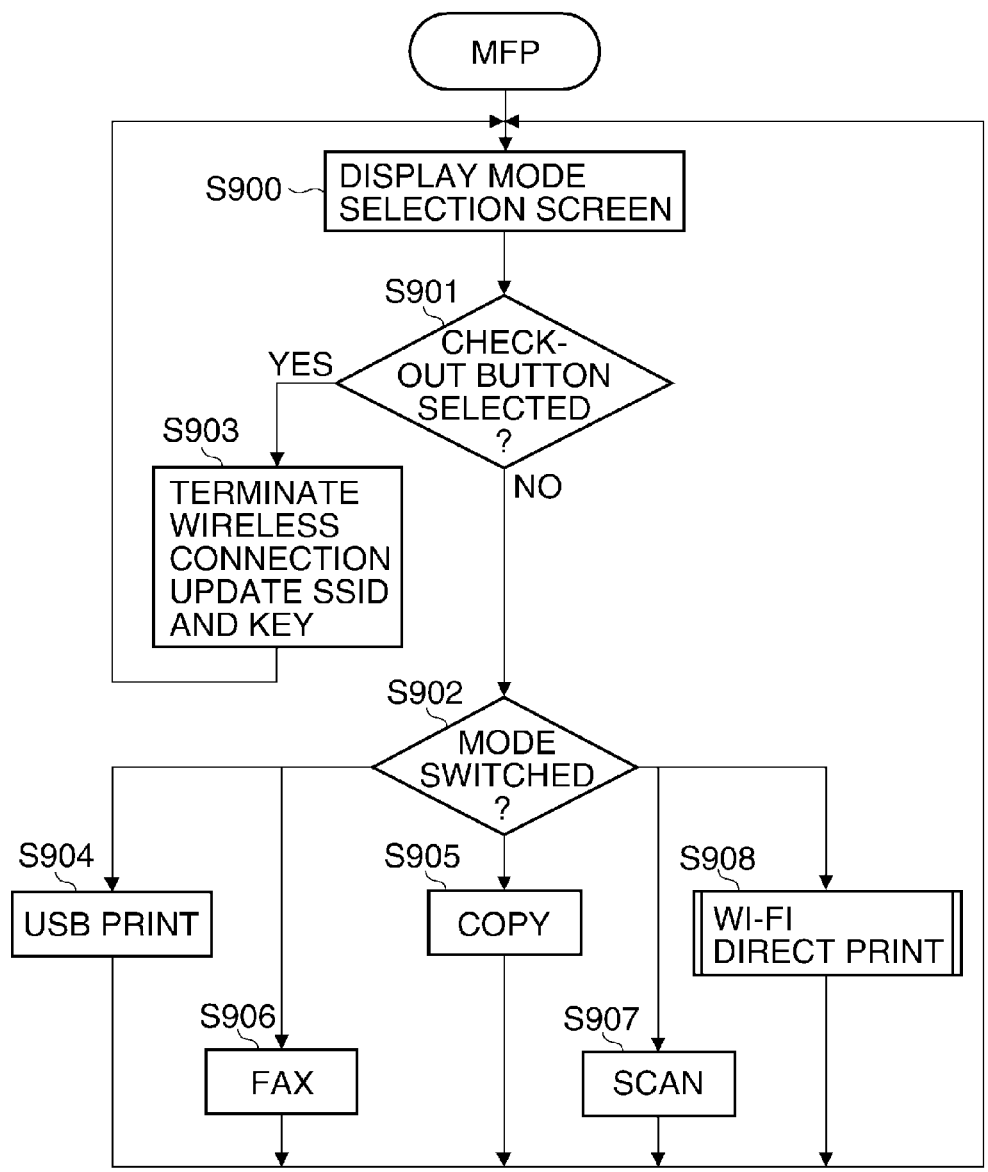
FIG. 4 is a flowchart showing a process that is carried out by a CPU when a Wi-Fi Direct Print function of the MFP is used.
Figure 5:
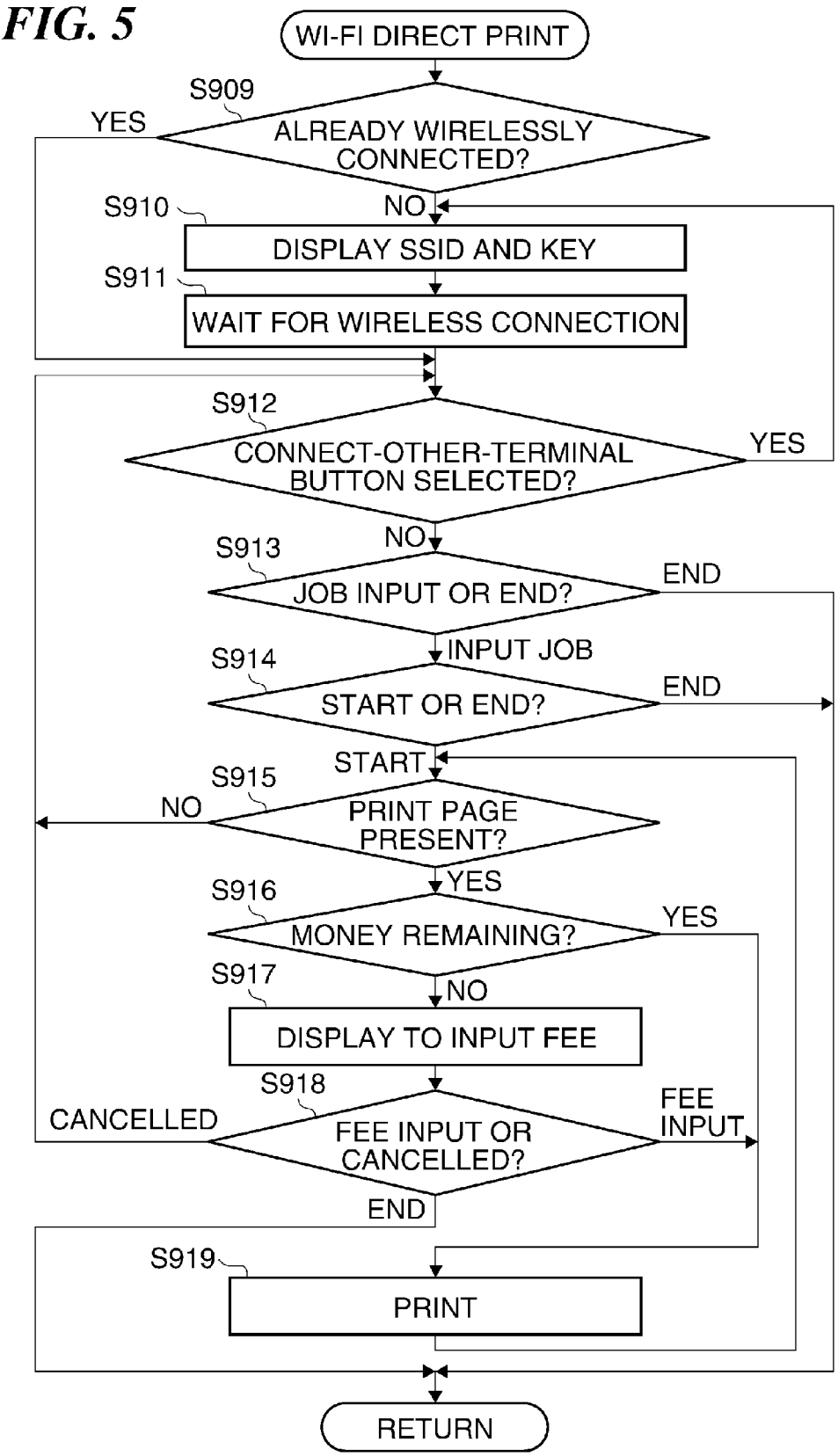
FIG. 5 is a flowchart showing in detail step S908 in FIG. 4.

FIG. 4 is a flowchart showing a process that is carried out by the CPU 210 when the user uses the Wi-Fi Direct Print function with the MFP 200. FIG. 5 is a flowchart showing in detail a process in step S908 in FIG. 4. Steps in the figures are implemented by the CPU 210 loading programs stored in the RAM 211 and executing the same.

Referring to FIG. 4, in step S900, the CPU 210 displays the mode selection screen in FIG. 3 on the display unit 303 of the operating unit 204. Then, in step S901, the CPU 210 determines whether or not the check-out button 405 has been depressed. When the CPU 210 determines that the check-out button 405 has been depressed, the process proceeds to step S903, and when the CPU 210 determines that the check-out button 405 has not been depressed, the process proceeds to step S902.

In the step S902, the CPU 210 determines whether or not any of mode switching buttons (from the copy button 400 to the fax button 404) other than the check-out button 405 has been depressed. The CPU 210 then carries out a process in a mode corresponding to the depressed button, and after the process is completed, the process returns to the step S901.

For example, when the USB button 403 is depressed, the process proceeds to step S904. When the copy button 400 is depressed, the process proceeds to step S905. When the fax button 404 is depressed, the process proceeds to step S906. When the scan button 401 is depressed, the process proceeds to step S907. When the mobile button 400 is depressed, the process proceeds to step S908. In the step S908, processing of a job received from the terminal device 301 wirelessly connected to the MFP 200 is carried out.

Referring next to FIG. 5, a description will be given of the step S908 in FIG. 9.

Referring to FIG. 5, steps S909 to S915 represent concrete processes implemented by the Wi-Fi Direct Print function (the step S908).

First, in the step S909, the CPU 210 determines whether or not the MFP 200 has already been wirelessly connected to the terminal device 301. When the CPU 210 determines that the MFP 200 has already been wirelessly connected to the terminal device 301, the process proceeds to the step S912, and when the CPU 210 determines that the MFP 200 has no yet been wirelessly connected to the terminal device 301, the process proceeds to the step S910.

Figure 6A:
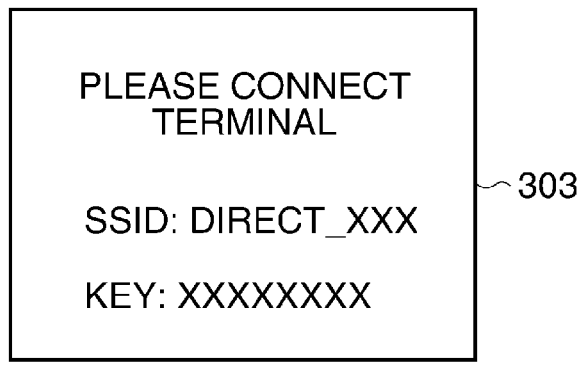
FIG. 6A is a view showing an exemplary screen displayed on a display unit in step S910 in FIG. 5.

In the step S910, the CPU 210 displays a screen in FIG. 6A on the display unit 303 to show information (including an SSID, KEY, and so on) required for wireless connection with the terminal device 301.

Next, in the step S911, the CPU 210 stands by until the MFP 200 is wirelessly connected to the terminal device 301, and after the MFP 200 is wirelessly connected to the terminal device 301, the process proceeds to the step S912.

Figure 6B:
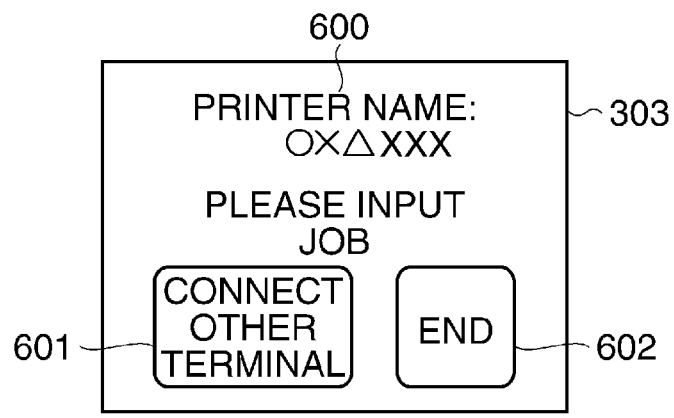
FIG. 6B is a view showing an exemplary screen displayed on the display unit in step S912 in FIG. 5.

In the step S912, the CPU 210 displays a screen in FIG. 6B on the display unit 303 to prompt the user to input a job.

The screen in FIG. 6B is equipped with a printer name display area 600 so that when the user inputs a job from the terminal device 301, an MFP to which he or she inputs the job can be clear. A name of the MFP 200 is displayed in the printer name display area 600.

Referring to FIG. 5 again, the CPU 210 determines whether or not a connect-other-terminal button 601 has been depressed on the screen in FIG. 6B, and when the CPU 210 determines that the connect-to-other-terminal button 601 has been depressed, the process returns to the step S910, and on the other hand, when the CPU 210 determines that the connect-other-terminal button 601 has not been depressed, the process proceeds to step S913.

In the step S913, the CPU 210 stands by until a job is input from the terminal device 301 or until an end button 602 is depressed, and when the CPU 210 determines that a job has been input, the process proceeds to the step S914. On the other hand, when the CPU 210 determines that the end button 602 has been depressed, it terminates the Wi-Fi Direct Print function and returns.

Figure 6C:
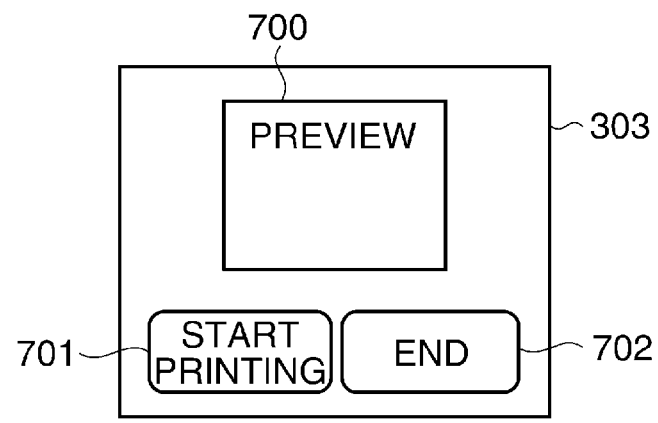
FIG. 6C is a view showing an exemplary screen displayed on the display unit in step S914 in FIG. 5.

In the step S914, the CPU 210 displays a screen in FIG. 6C on the display unit 303. On the screen in FIG. 6C, a preview display section 700 where a preview image of the input job is displayed is disposed.

Referring to FIG. 5 again, when the CPU 210 determines that a print start button 701 has been depressed on the screen in FIG. 6C, the process proceeds to the step S915, and on the other hand, when an end button 702 has been depressed, the CPU 120 terminates the Wi-Fi Direct Print function and returns.

In the step S915, the CPU 210 determines whether or not there is any print page after printing is started, and when there is no print page, the CPU 210 terminates the job, and the process returns to the step S912. On the other hand, when the CPU 210 determines that there is any print page, the process proceeds to step S916.

In the step S916, the CPU 210 determines whether or not enough money remains to continue printing, and when the CPU 210 determines that enough money does not remain, the process proceeds to step S917, and on the other hand, when the CPU 210 determines that enough money remains, the process proceeds to step S919.

Figure 7A:
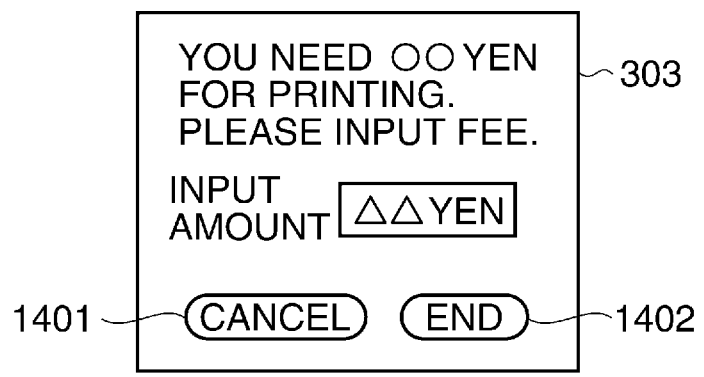
FIG. 7A is a view showing an exemplary screen displayed on the display unit in step S917 in FIG. 5.

In the step S917, the CPU 210 displays a screen in FIG. 7A on the display unit 303 to prompt the user to input a fee.

Then, in step S918, the CPU 210 stands by until the fee has been input, until a cancel button 1401 has been depressed, or until an end button 1402 has been depressed, and when the CPU 210 determines that the prescribed fee has been input, the process proceeds to the step S919. On the other hand, when the cancel button 1401 has been depressed, the CPU 210 terminates the job, and the process returns to the step S912. On the other hand, when the end button 1402 has been depressed, the CPU 210 ends the job, deactivates the Wi-Fi Direct Print function, and returns.

Figure 7B:
FIG. 7B is a view showing an exemplary screen displayed on the display unit in step S919 in FIG. 5.

In the step S919, the CPU 210 displays a screen in FIG. 7B on the display unit 303, and after a page is printed, the process returns to the step S915.

After the Wi-Fi Direct Print function is deactivated, the process returns to the step S900 in FIG. 4, in which the mode selection screen in FIG. 3 is displayed on the display unit 303. Then, in the step S901, when the CPU 210 determines that the check-out button 405 has been depressed, the process proceeds to the step S903, in which the CPU 210 terminates the wireless connection with the terminal device 301 and updates wireless connection information (such as an SSID and a KEY), followed by the process returning to the step S900.

FIG. 8 is a chart showing the flow of wireless connection information update in a case where a user A executes jobs using the Wi-Fi Direct Print function, the copy function, and the Wi-Fi Direct Print function in this order, and after that, a user B uses the Wi-Fi Direct Print function.

First, in S1, to cause the MFP 200 to perform the Wi-Fi Direct Print function using the terminal device 301, the user A shifts the MFP 200 into a Wi-Fi Direct Print mode.

Next, in S2, based on information displayed on the display unit 303 of the MFP 200, the user A performs an operation to establish a Wi-Fi Direct connection.

Then, in S3, the user A inputs a Wi-Fi Direct Print job to the MFP 200 using the terminal device 301, and after the job is completed, the user A exits the Wi-Fi Direct Print mode.

After that, in S5, to cause the MFP 200 to perform copying, the user A shifts the MFP 200 into a copy mode, and in S6, the use A causes the MFP 200 to execute a copy job. After the copy job is completed, the user A exits the copy mode in S7. Finally, to cause the MFP 200 to execute a Wi-Fi Direct Print job, the user A shifts the MFP 200 into a Wi-Fi Direct Print in S8. At this time, since the MFP 200 and the terminal device 301 were wirelessly connected to each other in S2, the user A directly inputs a Wi-Fi Direct Print job to the MFP 200 using the terminal device 301 and causes the MFP 200 to execute the job in S9.

After the job is completed, the user A exits the Wi-Fi Direct Print mode in S10, and pays a fee charged for execution of the sequential jobs in S11. With the payment, the MFP 200 terminates the wireless connection with the terminal device 301 and updates wireless connection information (such as an SSID and a KEY).

Then, in S13, to cause the MFP 200 to execute a Wi-Fi Direct Print job, the user B shifts the MFP 200 into the Wi-Fi Direct Print mode.

In S14, the user B establishes a Wi-Fi Direct connection. In S15, the user B inputs a Wi-Fi Direct Print job using another terminal device, and after the job is completed, exits the Wi-Fi Direct Print mode.

Here, wireless connection information in the MFP 200 was updated in S12, and hence even if the terminal device 301 of the user A lies near the terminal device of the user B in S14, wireless connection information used by the user B is different from that recorded in the terminal device 301 of the user A. For this reason, the terminal device 301 of the user A is not wirelessly connected to the MFP 200.

In the embodiment described above, the MFP 200 has the mode in which a job input from the terminal device 301 wirelessly connected to the MFP 200 is processed (the Wi-Fi direct Print mode), and the mode (such as the copy mode) in which a job input by operating the main body is processed (such as the copy mode). When it is determined that the users who use these two modes have changed (YES in the step S901), wireless connection information required for wireless connection is updated (step S903). It is determined that users have changed when, for example, a user pays a fee.

According to the embodiment described above, since wireless connection information required for wireless connection is not updated while the same user is using the MFP 200, users do not have to configure wireless connection settings each time they establish a wireless connection, and as a result, the burden on the users can be reduced, and the ease of use for the users can be enhanced.

In the embodiment described above, when the user who uses the MFP 200 changes from the user A to the user B, that is, when the user A pays a fee, wireless connection between the MFP 200 and the terminal device 301 is terminated to update wireless connection information.

However, in a utilization form in which user authentication is required to use the MFP 200, wireless connection between the MFP 200 and the terminal device 301 may be terminated to update wireless connection information when the user A logs out.

Figure 9:
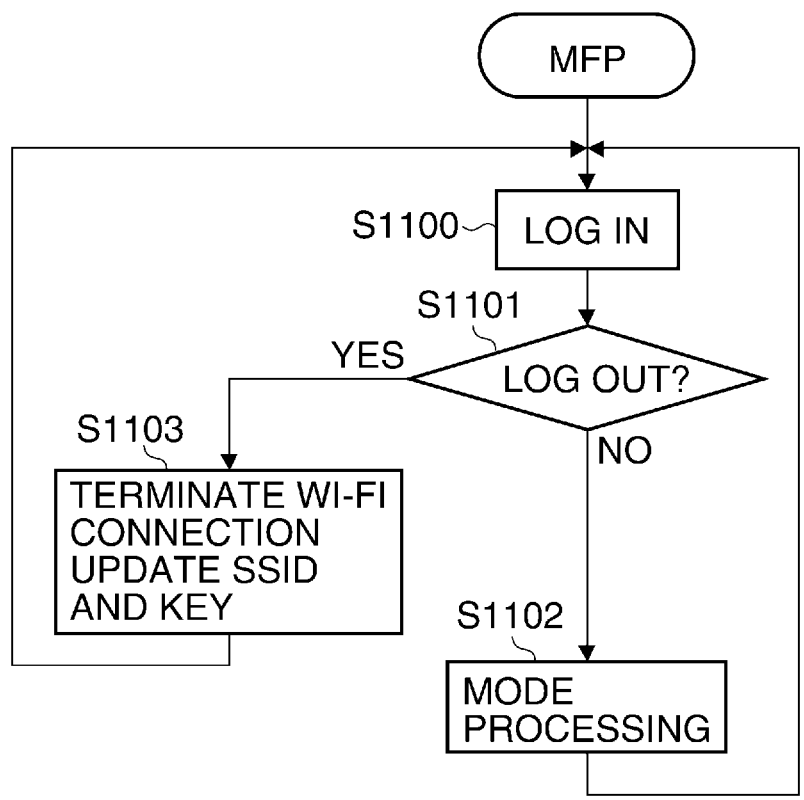
FIG. 9 is a flowchart showing a variation of the process that is carried out by the CPU when the Wi-Fi Direct Print function of the MFP is used.

FIG. 9 is a flowchart showing a variation of the process that is carried out by the CPU 210 when the Wi-Fi Direct Print function of the MFP 200 that requires user authentication is used. Steps in the figure are implemented by the CPU 210 loading programs stored in the RAM 211 and executing the same.

Figure 10A:
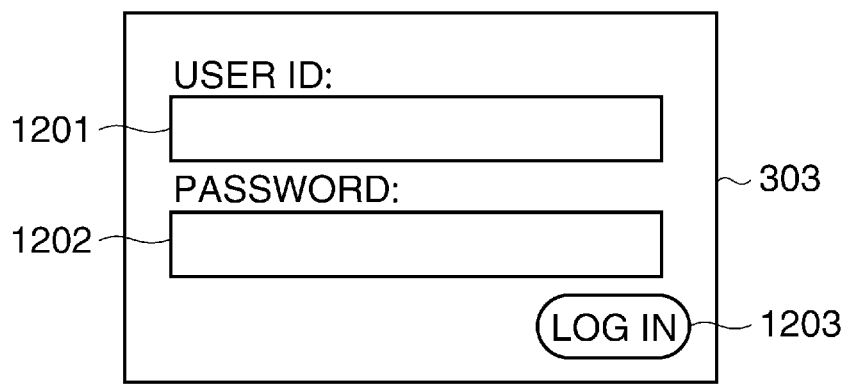
FIG. 10A is a view showing an exemplary login screen displayed on the display unit in step S1100 in FIG. 9.

Referring to FIG. 9, in step S1110, the CPU 210 displays a login screen in FIG. 10A on the display unit 303 of the operating unit 204. The user enters authentication information into a user ID input field 1201 and a password input field 1022 on the login screen and then depresses a login button 1203. The CPU 210 checks the authentication information to perform user authentication, and when the authentication is successful, the CPU 210 displays a screen in FIG. 10B on the display unit 303, followed by the process proceeding to step S1101.

In the step S1101, the CPU 210 determines whether or not a logout button 1305 has been depressed, and when the CPU 210 determines that the logout button 1305 has been depressed, the process proceeds to step S1103, and on the other hand, when the CPU 210 determines that the logout button 1305 has not been depressed, the process proceeds to step S1102.

Figure 10B:
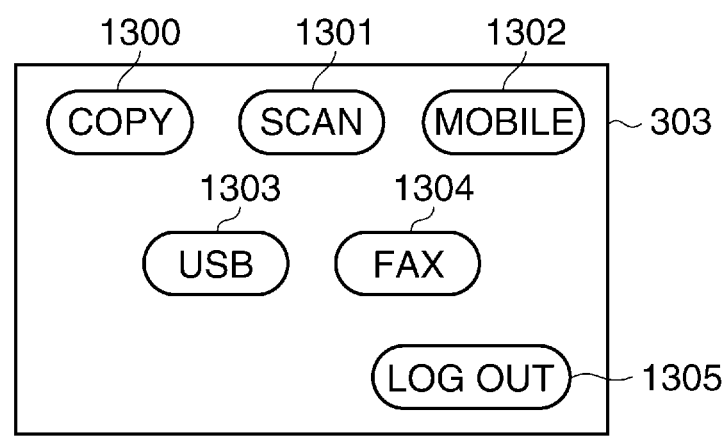
FIG. 10B is a view showing an exemplary screen displayed on the display unit in step S1103 in FIG. 9.

In the step S1102, the CPU 210 carries out a process in a mode corresponding to a depressed one of buttons (from a copy button 1300 to a FAX button 1304) other than the logout button 1305 on the screen in FIG. 10B. The concrete process is the same as that in the step S900 and the subsequent processes in FIG. 4.

In the step S1103, the CPU 210 terminates the wireless connection established by the terminal device 301 in the process in the step S1102 and updates wireless connection information (an SSID, a KEY, and so on), followed by the process returning to the step S1100.

In a utilization form that requires user authentication, the MFP 200 has a mode in which a job input from the terminal device 301 wirelessly connected to the MFP 200 is processed (a Wi-Fi Direct Print mode), and a mode in which a job input by operating the main body is processed (such as a copy mode). When it is determined that users who use these two modes have been changed (YES in the step S1101), wireless connection information required for wireless connection is updated (step S1103). It is determined that the users have been changed when, for example, a user has logged off.

According to the embodiment described above, since wireless connection information required for wireless connection is not updated while the same user is using the MFP 200, users do not have to configure wireless connection settings each time they establish a wireless connection, and as a result, the burden on the users can be reduced, and the ease of use for the users can be enhanced.

Although the above description of the embodiment has been given in relation to Wi-Fi, the present invention is not limited to this, but it goes without saying that the present invention may be applied to other near field communication methods. Moreover, in the above description, wireless connection information includes an SSID and an encryption key (KEY), but they are intended to comply with wireless communication standards, and if the standards are different, the corresponding wireless connection information should not be limited to them.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-249183, filed Dec. 2, 2013, which is hereby incorporated by reference herein in its entirety.

What is claimed is:

1. An image forming apparatus comprising:
a processor connected to a memory, the processor and memory configured to:
cause a user to log on the image forming apparatus by performing a user authentication process;
carry out a wireless communication;
display wireless connection information for carrying out the wireless communication between an external device and the image forming apparatus; and
generate new wireless connection information in response to the user logging off the image forming apparatus,
wherein new wireless connection information is not generated during a period from when the user has logged on the image forming apparatus to when the user logs off the image forming apparatus, and
wherein the new wireless connection information is generated independent of the completion of a wireless print job.

2. The image forming apparatus according to claim 1, wherein the wireless connection information includes an SSID and an encryption key.

3. The image forming apparatus according to claim 1, wherein the wireless communication is based on Wi-Fi Direct.

4. The image forming apparatus according to claim 1, wherein in response to the user logging off the image forming apparatus, the new wireless connection information is generated and the wireless connection established between the external device and the image forming apparatus is disconnected.

5. The image forming apparatus according to claim 1, the processor and memory further configured to:
after the display of wireless connection information for carrying out the wireless communication between an external device and the image forming apparatus, and before the generating of new wireless connection information in response to the user logging off the image forming apparatus, begin and complete execution of the wireless print job in response to a request by the user.

6. A control method for an image forming apparatus, comprising:
an authentication step of causing a user to log on the image forming apparatus by performing a user authentication process;
a wireless communication step of carrying out a wireless communication;
a display unit step of displaying wireless connection information for carrying out the wireless communication between an external device and the image forming apparatus; and
a generating step of generating new wireless connection information in response to the user logging off the image forming apparatus,
wherein new wireless connection information is not generated during a period from when the user has logged on the image forming apparatus to when the user logs off the image forming apparatus, and
wherein the new wireless connection information is generated independent of the completion of a wireless print job requested by the user.

7. A non-transitory computer-readable storage medium storing a program for causing a computer to execute a control method for an image forming apparatus, the control method comprising:
an authentication step of causing a user to log on the image forming apparatus by performing a user authentication process;
a wireless communication step of carrying out a wireless communication;
a display unit step of displaying wireless connection information for carrying out the wireless communication between an external device and the image forming apparatus; and
a generating step of generating new wireless connection information in response to the user logging off the image forming apparatus,
wherein new wireless connection information is not generated during a period from when the user has logged on the image forming apparatus to when the user logs off the image forming apparatus, and
wherein the new wireless connection information is generated independent of the completion of a wireless print job requested by the user.

* * * * *